(12) United States Patent
Alvi et al.

(10) Patent No.: US 7,213,788 B1
(45) Date of Patent: May 8, 2007

(54) MICROJET-BASED CONTROL SYSTEM FOR CAVITY FLOWS

(75) Inventors: Farrukh S. Alvi, Tallahassee, FL (US); Chiang Shih, Tallahassee, FL (US); Anjaneyulu Krothapalli, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 14 days.

(21) Appl. No.: 11/143,103

(22) Filed: Jun. 1, 2005

Related U.S. Application Data

(60) Provisional application No. 60/575,537, filed on Jun. 1, 2004.

(51) Int. Cl.
*B64C 21/04* (2006.01)

(52) U.S. Cl. ..................................... 244/207

(58) Field of Classification Search ............. 244/118.1, 244/137.1, 130, 207
See application file for complete search history.

(56) References Cited

U.S. PATENT DOCUMENTS

| 2,896,881 | A | * | 7/1959 | Attinello | 244/207 |
|---|---|---|---|---|---|
| RE24,917 | E | * | 12/1960 | Attinello | 244/207 |
| 3,973,218 | A | * | 8/1976 | Kepler et al. | 372/104 |
| 4,483,497 | A | * | 11/1984 | Rethorst | 244/15 |
| 4,749,151 | A | * | 6/1988 | Ball et al. | 244/53 B |
| 4,858,850 | A | * | 8/1989 | McNay | 244/1 R |
| 5,069,397 | A | * | 12/1991 | Haslund | 244/1 R |
| 5,818,947 | A | * | 10/1998 | Cattafesta et al. | 381/71.7 |
| 6,098,925 | A | * | 8/2000 | Burdsall et al. | 244/118.1 |
| 6,206,326 | B1 | * | 3/2001 | Stanek et al. | 244/137.4 |
| 6,375,118 | B1 | * | 4/2002 | Kibens et al. | 244/53 R |
| 6,446,904 | B1 | * | 9/2002 | Stanek | 244/1 N |
| 6,739,554 | B1 | * | 5/2004 | Stanek | 244/137.1 |
| 6,837,456 | B1 | | 1/2005 | Shih et al. | |

* cited by examiner

*Primary Examiner*—Tien Dinh
(74) *Attorney, Agent, or Firm*—Peter Loffler

(57) ABSTRACT

A dynamic cavity air flow system reduces the highly unsteady flow over exposed aircraft cavities by incorporating a series of microjets proximate the leading edge of a cavity. The microjets, which may articulate, issue a supersonic jet flow toward the rear or trailing edge of the cavity whenever the cavity is exposed during flight. The microjets receive the air for the flow from either a dedicated pressurized gas source aboard the aircraft or from bleed air taken from an engine of the aircraft. Appropriate sensors and controllers are provided for control of the system.

35 Claims, 3 Drawing Sheets

MICROJET-BASED CONTROL SYSTEM FOR CAVITY FLOWS

This application claims the benefit of provisional patent application No. 60/575,537 filed on Jun. 1, 2004.

BACKGROUND OF THE INVENTION

1. Field of the Invention

The present invention relates to a system that uses a plurality of microjets located on a leading edge of a cavity located on an aircraft, which microjets issue a jet flow toward the trailing edge in order to reduce the unsteady air flow over whenever the cavity is exposed.

2. Background of the Invention

Aircraft in flight desire a relatively smooth and steady air flow over substantially the entire body of the aircraft. Such smooth and steady air flow reduces drag, air turbulence and pressure loading on various areas of the aircraft, resulting in increased performance including higher speed, greater stability, and handling, and reduced pressure and acoustic loading on the aircraft. Aircraft design including materials selection been made great strides in achieving this relatively smooth and steady air flow over most of the aircraft in order to produce aircraft that have superior performance characteristics.

One area or groups of areas of an aircraft that continue to have highly unsteady air flow over such areas are the cavities of an aircraft. Such cavities include landing gear wheel wells and internal weapons bays. These cavities tend to be closed or otherwise covered during flight and in such covered orientation, the cavities have relatively steady air flow thereover. However, at times, such coverings must be removed and the cavities exposed. This can occur when the aircraft is taking off and landing and during weapons systems release. When these cavities are exposed, a highly unsteady air flow passes over the cavities resulting in high dynamic pressures and acoustic loads in cavities and within the vicinity of the cavities. Such loading results in decreased and less stable flight dynamics of the aircraft as well as increased noise within the aircraft. Additionally, the unsteady air flow acts on the stores released from the cavities resulting in decreased delivery accuracy in the case of a weapons payload. Furthermore, the high dynamic loads in and around the cavity results, over time, in structural fatigue at the areas of the high loads.

In order to increase the stability of air flow over aircraft cavities, and thus reduce the high pressure loading, various methods have been proposed. Such methods fall into one of two broad categories. The first type of air flow control systems are passive in nature, such as fixed deflectors. The performance of such passive systems is marginal and such passive systems lack uniform response over a desired operating range. The other major type of air flow control systems for cavities are dynamic in nature. While such dynamic systems tend to have superior performance characteristics over passive systems, these types of systems either require too much power to effectively operate and thereby reduce available power to the aircraft's main functions, or tend to adversely affect aircraft performance whenever the systems are not needed, such as when the cavities are not exposed.

SUMMARY OF THE INVENTION

The microjet-based control system for cavity flows of the present invention addresses the aforementioned problems by providing a dynamic cavity air flow system that reduces the highly unsteady flow over exposed aircraft cavities in order to increase flight and payload performance. The microjet-based control system for cavity flows consumes but a fraction of the overall power of the aircraft and is performance neutral to the aircraft when not being utilized.

The microjet-based control system for cavity flows of the present invention is installed on an aircraft having an airframe with a cavity (wheel well, bomb bay, refueling port, etc.), located on the airframe, the cavity having a leading edge and a trailing edge. A plurality of microjets are located on the leading edge of the cavity. The microjets issues a jet flow toward a trailing edge of the cavity whenever the cavity is exposed during flight of the aircraft, which jet flow is supersonic. A plenum has an input port that is fluid flow connected to a high pressure gas source and has a plurality of output ports, each output port fluid flow connected to a respective one of the plurality of microjets. A control valve is provided for controls the plenum. A control system is connected to the plurality of microjets and to the control valve for adaptively controlling the microjets. Input means are provided for providing input data to the control system for use by the control system in providing the adaptive control of the plurality of microjets. The input means comprises an appropriate sensor located on the aircraft body, downstream of the plurality of microjets. The high pressure gas source may be bleed air taken from an engine of the aircraft. At least some of the plurality of microjets is capable of articulation in order to change the direction of the jet flow.

BRIEF DESCRIPTION OF THE DRAWINGS

Similar reference numerals refer to similar parts throughout the several views of the drawings.

DESCRIPTION OF THE PREFERRED EMBODIMENT

Figure 1:
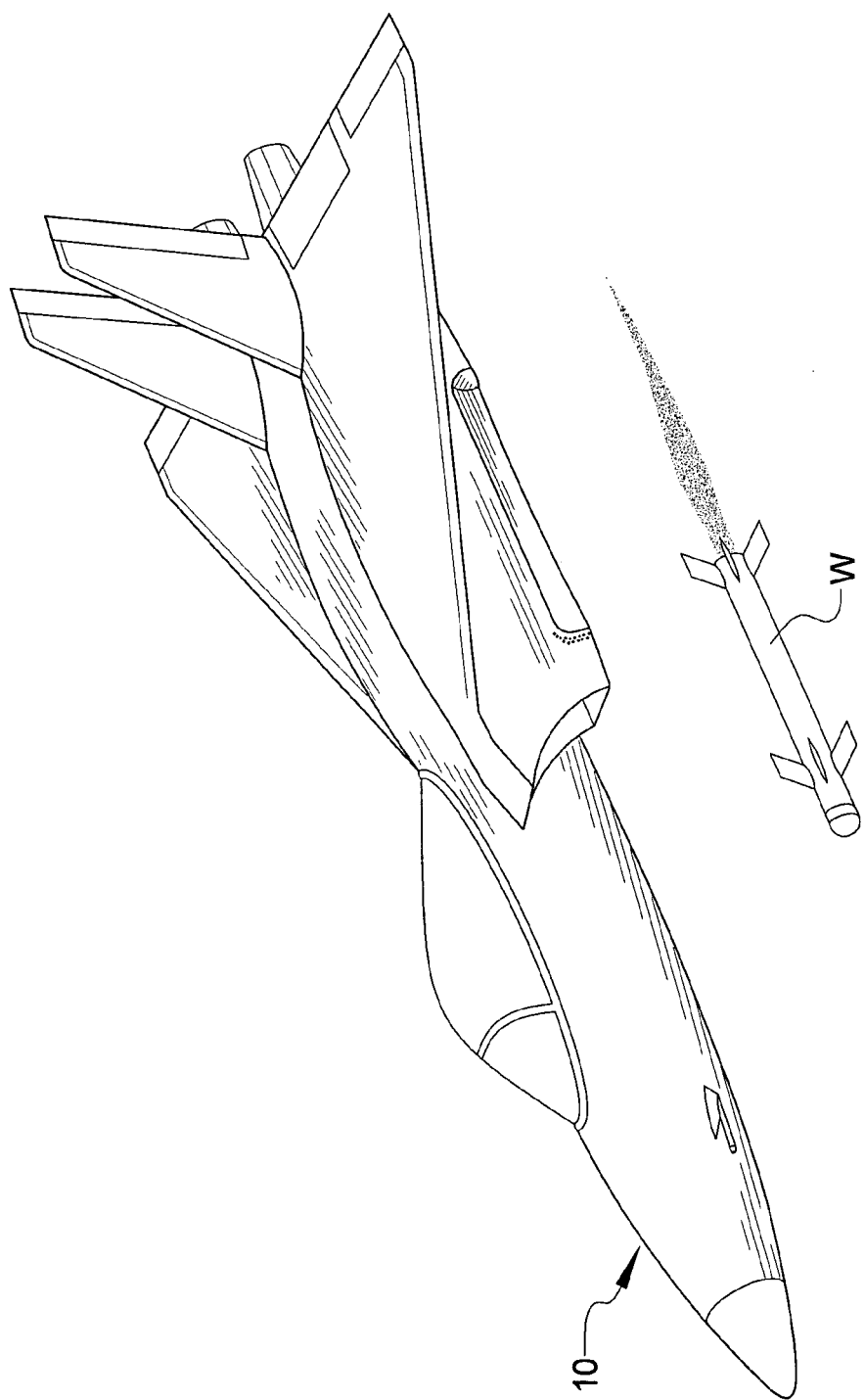
FIG. 1 is a perspective view of a typical fighter jet utilizing microjet blowing over the leading edge of the weapons bay recess.
Figure 2:
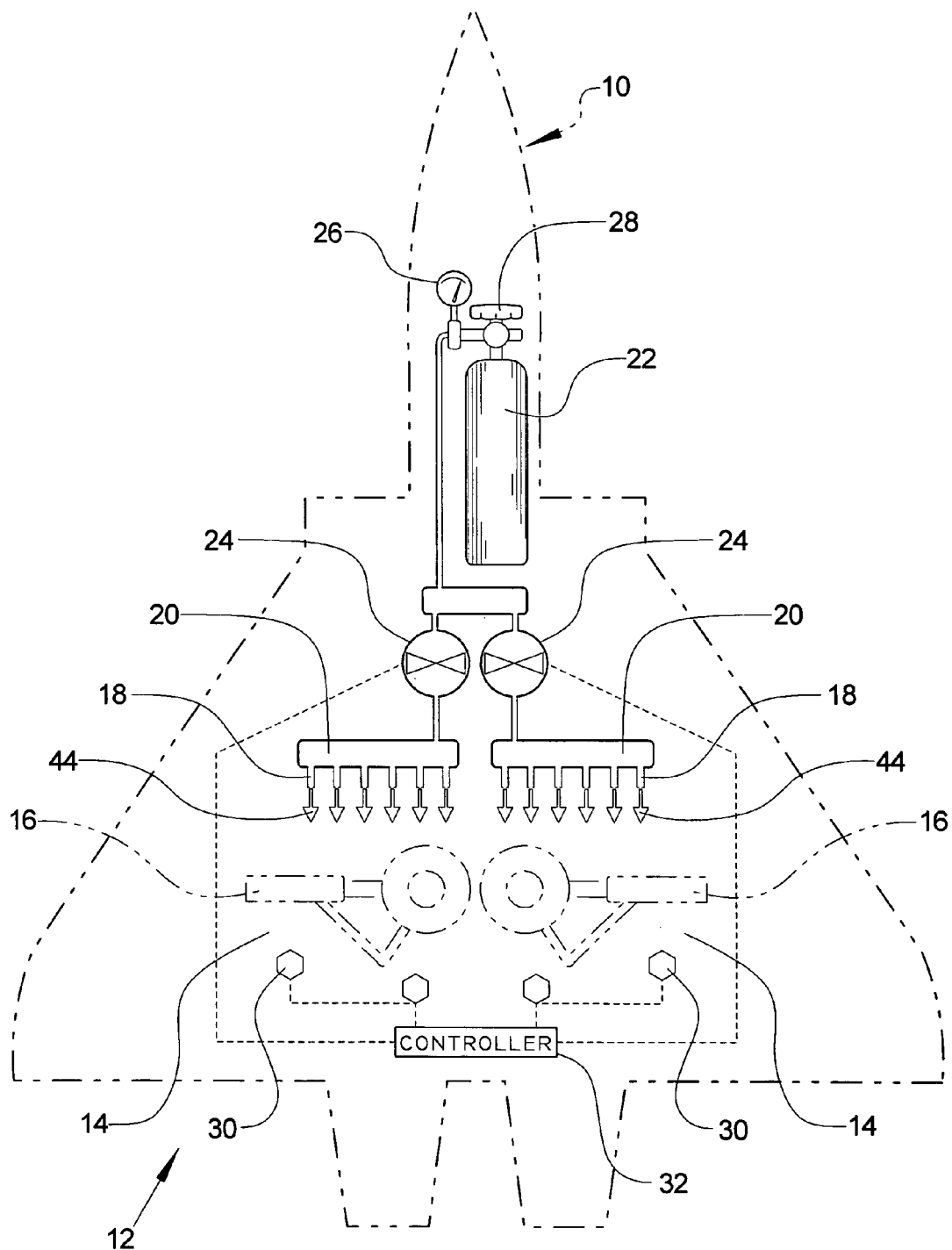
FIG. 2 is a schematic view of the microjet-based control system for cavity flows being used to control the supersonic flows over the aircraft's wheel wells utilizing stored compressed gas to produce the microjet flow.

As seen in FIG. 1, a typical aircraft 10, in this case a fighter aircraft, uses the microjet-based control system for cavity flows of the present invention 12 to reduce the unsteady air flow over the weapons bay of the aircraft 12 upon weapons W release. As seen in FIG. 2, the microjet-based control system for cavity flows 12 is being utilized to reduce the unsteady air flow over the rear wheel well areas 14 of the aircraft 10 that hold the rear landing gear 16. As more specifically seen in this figure, the microjet-based control system for cavity flows 12 comprises a series of microjets 18 located proximate the leading edge of the cavity 14. Each microjet 18 is attached to a plenum 20. Each microjet 18 may be fixedly attached to the plenum 20, or may be provided with an actuator (not illustrated) that allows up and down and side to side articulation of the microjet 18. The plenum 20 is fluid flow connected to a source of pressured gas 22 with each plenum 20 having an appropriate pressure and flow control valve 24 disposed between the plenum 20 and the source of pressurized gas 22.

Appropriate instrumentation such as a pressure gauge 26 and a control valve 28 are associated with the source of pressurized gas 22. Sensors 30 of any appropriate design are located down stream of the microjets 18. A controller 32 controls system performance and is signal processing connected to the sensors 30, the pressure gauge 26 and compressed gas control valve 28, the plenum control valves 24, as well as to various core systems of the aircraft 10.

Figure 3:
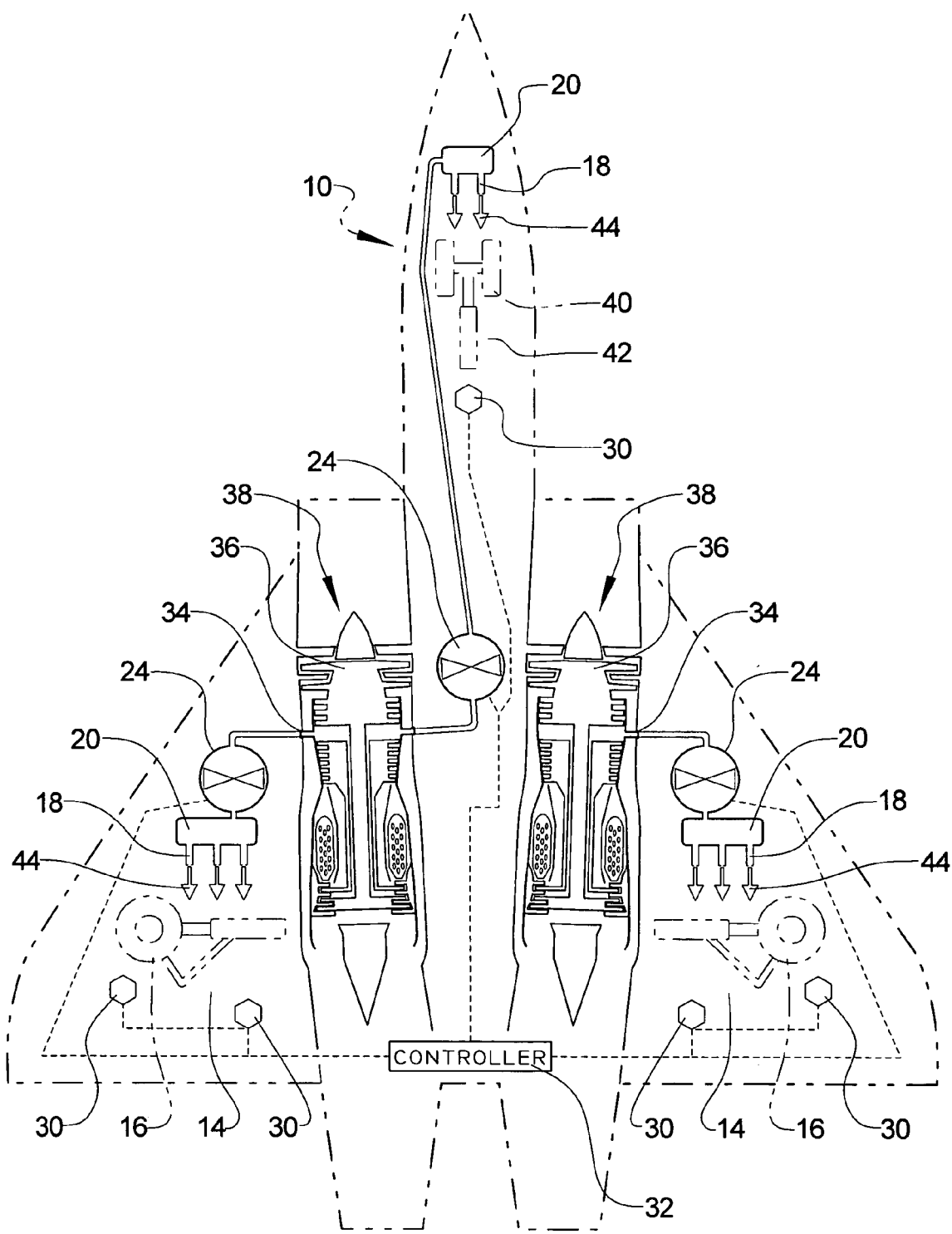
FIG. 3 is a schematic view of the microjet-based control system for cavity flows being used to control the supersonic flows over the aircraft's wheel wells utilizing engine compressor bleed air to produce the microjet flow.

As seen in FIG. 3, a similar system is implemented, however, as seen, instead of using a stored tank of pressed gas 22, the plenums 20 are fluid flow connected to bleed valves 34 on the compressor 36 of the aircraft's engine 38. As also seen in this figure, a microjet subsystem is also disposed at the front landing gear 40 wheel well 42 (omitted from FIG. 2 for brevity and clarity).

In operation, during steady flight, when the aircraft 10 does not have any exposed cavities, the system 12 is not operating. When a cavity 14 is uncovered, the microjets 18 issue a supersonic microjet flow 44 toward the rear of the cavity 14. This microjet flow 44, which is a small fraction of the overall thrust being produced by the engines 38 of the aircraft 10 (the specific fraction being dependent on many variables such as the size of the aircraft, the size of the cavities, the overall thrust generated by the engines 38 etc., however the overall flow should be on the order of less than 2 percent of the overall thrust produced by the aircraft 10), comes either from the stored source of pressurized gas 22 or from the bleed of the engine 38. The microjet flow 44 reduces the unsteady air flow over the cavities 14 and reduces the dynamic pressure loading on the cavities 14 and the surrounding areas.

The microjets are controlled by the various control systems including the valves 24, the actuators, if used, and the pressure gauge 26 and control valve 28 (whether the source of pressured gas is the stored tank 22 or the bleed air coming off of the aircraft's engine 38). Overall system 12 control is maintained by the controller 32 which determines which cavities 14 are exposed and thus what microjets 18 to utilize, at what angles are the microjets 18 to be set (if actuators are used) and how much air flow 44 each microjet is to produce. These parameters are determined by a host of factors including the speed and altitude of the aircraft 10, the attitude of the aircraft 10, the specific position on the aircraft 10 of the cavity 14 that a specific set of microjets 18 is to control, the power requirements of the aircraft 10 if the microjets 18 receive their source of supersonic air flow 44 from the engines 38 of the aircraft 10, etc. Feedback to the controller 32 is provided by the various sensors 30 located downstream of the microjets 18. Advantageously, the controller 32 is an integrated component of the aircraft's avionics.

The microjet-based control system for cavity flows 12 can be used on both civilian as well as military aircraft 10. Additionally, the microjet-based control system for cavity flows 12 need not only control air flow over cavities 14 located on the underbelly of an aircraft 10, the microjet-based control system for cavity flows 12 is equally utilizable on side cavities of an aircraft 10, for example, the weapons systems openings located on an MC130 Gun Ship, or on top surface located cavities, for example, the air refuel nozzle receptor pod of many military aircraft 10.

While the invention has been particularly shown and described with reference to an embodiment thereof, it will be appreciated by those skilled in the art that various changes in form and detail may be made without departing from the spirit and scope of the invention.

We claim:

1. A microjet system comprising:
   a plurality of discrete microjets located on a leading edge of a cavity located on an aircraft body, each microjet issuing a discrete jet flow;
   a plenum having an input port fluid flow connected to a high pressure gas source and a plurality of output ports, each output port fluid flow connected to a respective one of the plurality of microjets;
   a control valve for controlling the plenum; and
   wherein each microjet issues its jet flow toward a trailing edge of the cavity whenever the cavity is exposed during flight of the aircraft and wherein at least some of the plurality of microjets is capable of articulation in order to change the direction of the jet flow.

2. The microjet system as in claim 1 wherein the jet flow is supersonic.

3. The microjet system as in claim 1 further comprising a control system, connected to the plurality of microjets for adaptively controlling the microjets.

4. The microjet system as in claim 3 further comprising input means for providing input data to the control system for use by the control system in providing the adaptive control of the plurality of microjets.

5. The microjet system as in claim 4 wherein the input means comprises a sensor located on the aircraft body, downstream of the plurality of microjets.

6. The microjet system as in claim 1 further comprising a control system, connected to the control valve for adaptively controlling the microjets.

7. The microjet system as in claim 6 further comprising input means for providing input data to the control system for use by the control system in providing the adaptive control of the plurality of microjets.

8. The microjet system as in claim 7 wherein the input means comprises a sensor located on the aircraft body, downstream of the plurality of microjets.

9. The microjet system as in claim 1 wherein the high pressure gas source is bleed air taken from an engine of the aircraft.

10. A microjet system comprising:
    an aircraft having an airframe with a cavity located on the airframe, the cavity having a leading edge and a trailing edge;
    a plurality of discrete microjets located on the leading edge of the cavity; and
    wherein each microjet issues a discrete jet flow toward a trailing edge of the cavity whenever the cavity is exposed during flight of the aircraft and wherein at least some of the plurality of microjets is capable of articulation in order to change the direction of the jet flow.

11. The microjet system as in claim 10 wherein the jet flow is supersonic.

12. The microjet system as in claim 10 further comprising a control system, connected to the plurality of microjets for adaptively controlling the microjets.

13. The microjet system as in claim 12 further comprising input means for providing input data to the control system for use by the control system in providing the adaptive control of the plurality of microjets.

14. The microjet system as in claim 13 wherein the input means comprises a sensor located on the aircraft body, downstream of the plurality of microjets.

15. The microjet system as in claim 10 further comprising:
    a plenum having an input port fluid flow connected to a high pressure gas source and a plurality of output ports, each output port fluid flow connected to a respective one of the plurality of microjets; and a control valve for controlling the plenum.

16. The microjet system as in claim 15 further comprising a control system, connected to the control valve for adaptively controlling the microjets.

17. The microjet system as in claim 16 further comprising input means for providing input data to the control system for use by the control system in providing the adaptive control of the plurality of microjets.

18. The microjet system as in claim 17 wherein the input means comprises a sensor located on the aircraft body, downstream of the plurality of microjets.

19. The microjet system as in claim 15 wherein the high pressure gas source is bleed air taken from an engine of the aircraft.

20. A method for controlling the unsteady air flow over an exposed cavity located on an aircraft, the cavity having a leading edge and a trailing edge, the method comprising the steps of:

providing a plurality of discrete microjets and locating the plurality of microjets on the leading edge of a cavity, each microjet issuing a discrete jet flow;

providing a plenum that has an input port and a plurality of output ports;

fluid flow connecting the input port to a high pressure gas source;

fluid flow connecting each output port to a respective one of the plurality of microjets;

providing a control valve for controlling the plenum; and having each microjet issues its jet flow toward the trailing edge of the cavity whenever the cavity is exposed during flight of the aircraft and wherein at least some of the plurality of microjets is capable of articulation in order to change the direction of the jet flow.

21. The method as in claim 20 wherein the jet flow is supersonic.

22. The method as in claim 20 further comprising the step of providing a control system, connected to the plurality of microjets for adaptively controlling the microjets.

23. The method as in claim 22 further comprising the step of providing input means for providing input data to the control system for use by the control system in providing the adaptive control of the plurality of microjets.

24. The method as in claim 23 wherein the input means comprises a sensor located on the aircraft body, downstream of the plurality of microjets.

25. The method as in claim 20 further comprising the step of providing a control system, connected to the control valve for adaptively controlling the microjets.

26. The method as in claim 25 further comprising the step of providing input means for providing input data to the control system for use by the control system in providing the adaptive control of the plurality of microjets.

27. The method as in claim 26 wherein the input means comprises a sensor located on the aircraft body, downstream of the plurality of microjets.

28. The method as in claim 20 wherein the high pressure gas source is bleed air taken from an engine of the aircraft.

29. A method for controlling the unsteady air flow over an exposed cavity located on an aircraft, the cavity having a leading edge and a trailing edge, the method comprising the steps of:

providing a plurality of discrete microjets and locating the plurality of microjets on the leading edge of a cavity, each microjet issuing a discrete jet flow; and having each microjet issues its jet flow toward the trailing edge of the cavity whenever the cavity is exposed during flight of the aircraft and at least some of the plurality of microjets, is capable of articulation in order to change the direction of the jet flow.

30. The method as in claim 29 wherein the jet flow is supersonic.

31. The method as in claim 29 further comprising the step of providing a control system, connected to the plurality of microjets for adaptively controlling the microjets.

32. The method as in claim 31 further comprising the step of providing input means for providing input data to the control system for use by the control system in providing the adaptive control of the plurality of microjets.

33. The method as in claim 32 wherein the input means comprises a sensor located on the aircraft body, downstream of the plurality of microjets.

34. The method as in claim 29 wherein the plurality of microjets is connected to a high pressure gas source.

35. The method as in claim 34 wherein high pressure gas source is bleed air taken from an engine of the aircraft.

* * * * *